United States Patent [19]

Grobel et al.

[11] Patent Number: 4,723,241
[45] Date of Patent: Feb. 2, 1988

[54] DATA TRANSMISSION ARRANGEMENT INCLUDING A RECONFIGURATION FACILITY

[75] Inventors: Dieter Grobel, Achim; Peter Jathe, Daverden; Peter Steffen, Sudweyhe, all of Fed. Rep. of Germany

[73] Assignee: U.S. Philips Corporation, New York, N.Y.

[21] Appl. No.: 756,201

[22] Filed: Jul. 18, 1985

[30] Foreign Application Priority Data

Jul. 28, 1984 [DE] Fed. Rep. of Germany ....... 3427891

[51] Int. Cl.⁴ .............................................. G06F 11/20
[52] U.S. Cl. ........................................ 371/11; 370/16; 371/8
[58] Field of Search ................. 371/8, 11, 22; 370/14, 370/16, 86, 88

[56] References Cited

U.S. PATENT DOCUMENTS

| Re. 28,958 | 9/1976 | Zafiropulo et al. | 371/11 |
| 4,231,015 | 10/1980 | Union | 371/11 |
| 4,354,267 | 10/1982 | Mori et al. | 371/11 |
| 4,390,984 | 6/1983 | Sugiura et al. | 370/88 |
| 4,527,270 | 7/1985 | Sweeton | 371/11 |
| 4,538,264 | 8/1985 | Bahr et al. | 371/8 |
| 4,594,709 | 6/1986 | Yasue | 371/8 |

FOREIGN PATENT DOCUMENTS 1493899  11/1987  United Kingdom .

OTHER PUBLICATIONS

Ihara et al., Highly Reliable Loop Computer Network System Based on Autonomous Decentralization Concept, FTCS 12th Annual Intl. Symposium, Fault-Tolerant Computing, Santa Monica, Jun. 22-24, 1982, pp. 187-194.

Lee, Dynamically Reconfigurable Logical Ring Network, IBM Technical Discl. Bulletin, vol. 21, No. 8, Jan. 1979, pp. 3349-3350.

Primary Examiner—Charles E. Atkinson
Attorney, Agent, or Firm—Thomas A. Briody; Jack E. Haken; Anne E. Barschall

[57] ABSTRACT

The construction of an arrangement for data transmission between a number of interconnection units should be realized so that, after a disturbance, an extensive reconfiguration of the arrangement is possible, so that all interconnection units which still communicate via a connection are interconnected by means of transmission paths which merely follow a different course in comparison with the non-disturbed state. In accordance with the invention each interconnection unit is provided with a device for generating synchronization information and in the case of a disturbance, appearing as a breakdown of the normal data stream, all interconnection units enter a test state in which test information is transmitted and possibly received test information is returned via all connections. Consequently, in each interconnection unit it can be autonomously decided which data paths are to be interconnected. In the case of at least three data connections per interconnection unit, different configurations are feasible which enable a complete reconfiguration to be realized also in the case of multiple disturbed connections between the interconnection units.

31 Claims, 11 Drawing Figures

DATA TRANSMISSION ARRANGEMENT INCLUDING A RECONFIGURATION FACILITY

BACKGROUND OF THE INVENTION

1. Field of the Invention

The invention relates to an apparatus for the transmission of data between a number of interconnection units. Data receiving and/or data transmitting apparatus are connected to the interconnection units. Each interconnection unit comprises at least two physically separate data connections. Each data connection comprises at least two connection lines corresponding to respective transmission paths of opposite directions. The interconnection units are interconnected via the transmission paths so that in a non-disturbed state at least one data transmission path is formed which successively passes through all interconnection units in the apparatus. The apparatus includes a synchronization device which generates synchronization information in order to form a continual data stream. Each interconnection unit comprises a detector device for monitoring the data stream on the data transmission path. Upon detection of a disturbance of the data stream, the detector device interconnects the data connections so that there is again formed a transmission path which interconnects the interconnection units, avoiding the location of disturbance.

2. The Prior Art

Such an apparatus is known from U.S. Pat. No. 4,109,821. Therein, a number of interconnection units and a central station for generating synchronization information are connected so as to form a closed loop. Each interconnection unit comprises two data connections for an incoming line and an outgoing line. These lines between the data connections interconnect the interconnection units in such a manner that two separate, closed data transmission paths are obtained in which the direction of transmission is opposed. Only one of the two data transmission paths is used for data transmission, when all connections between all interconnection units are non-disturbed. The other data transmission path serves as a spare for disturbances. Data transmission from a first arbitrary interconnection unit to a second arbitrary interconnection unit takes place when the first interconnection unit inserts a message in a free location in the data stream. The message contains the address of the second interconnection unit. All interconnection units constantly monitor the data stream checking for their own address. If their address is found, the relevant message is taken up and the data stream is transmitted further, preferably without the relevant message. In an extreme case, an interconnection unit can thus transmit a message to the directly preceding interconnection unit in the data stream. In such a case a delay occurs because the message traverses substantially the entire data transmission path. The messages are generally transmitted in a frame structure which is fixed in time and which is determined by the synchronization information. Therefore delay time compensation in the prior art is performed by means of buffer memories, notably in the central station. This compensation is made in order to ensure that the shortest delay time, via the complete transmission path, amounts to at least one frame period.

A disturbance may occur in the data transmission path used for the data transmission due to an interruption of the connections between the interconnection units or a disturbance in the data transmission path inside an interconnection unit. Such a disturbance will be noticed by the next interconnection unit when data no longer arrive and especially when there is no synchronization information within given, fixed time intervals. This next interconnection unit then interrupts the unused data transmission path and connects the input thereof to the output for the original data transmission path. The non-disturbed state of the path which is not used for data transmission is also constantly monitored by constant transmission of monitoring data. The interconnection unit preceding the disturbed location detects the absence of this monitoring information and connects the input of the data transmission path used thus far to the output of the other data transmission path. The disturbed location is thus bridged by the other data transmission path. The delay times of transmitted messages are thus approximately doubled, but transmission of messages from a first arbitrary interconnection unit to a second arbitrary interconnection unit outside the disturbed location is still possible.

When a further disturbance occurs in another location in the data transmission path, the overall loop of interconnection units break down into two sections. A reconfiguration of the section comprising the central station for the synchronization information is then similarly possible. However, in the remainder of the interconnection units data transmission is then no longer possible. Moreover, in the section in which reconfiguration has taken place the delay time compensation must be adapted to the possible shortening of the transmission path.

SUMMARY OF THE INVENTION

It is the object of the invention to provide an arrangement of the described kind in which an extensive reconfiguration of all data transmission paths which still exist can be performed in a simple manner, even when several disturbances occur in the data transmission path.

This object is achieved in accordance with the invention as follows. Each interconnection unit comprises a synchronization device. The detector device in each interconnection unit activates, upon detection of a disturbance of the data stream, the synchronization device. Thus test information is transmitted to at least one neighbouring interconnection unit. The detector device also reads all test information received from any other interconnection unit. The detector device in each interconnection unit subsequently connects the data connections to one another or to the synchronization device, depending on the data connection on which test information was received and on the content of the test information.

When each interconnection unit is provided with a comparatively simple synchronization device and when a test procedure is initiated in the case of disturbances, each interconnection unit itself can in all circumstances unambiguously determine the state of the connections of other interconnection units. Each interconnection unit can subsequently determine, independently of the other interconnection units, which data connections are to be connected to one another or to the synchronization device. Notably an arrangement of interconnection units, which was originally in closed loop, may break down into several sections due to a plurality of disturbances. Each section itself can then form a complete arrangement for data transmission where all interconnection units present can exchange messages with one another.

Only when external connections are in order does a first interconnection unit correctly receive test information transmitted by other interconnection units upon detection of a disturbance of the data path. Therefore one interconnection unit can also determine whether a connection, dedicated to test information from another interconnection unit, is in order. However, when the connection dedicated to test information from one interconnection unit to another interconnection unit is interrupted, the one interconnection unit cannot easily detect the interruption. In order to ensure that each interconnection unit is informed about all lines within its data connections, the detector device in each interconnection unit preferably initiates the transmission of acknowledge information in response to each piece of test information correctly received by the interconnection unit. The detection device also evaluates subsequent acknowledge information at least on all incoming lines on which test information from another interconnection unit has appeared. Thus, the acknowledge information informs each interconnection unit whether the transmitted test information has been correctly received by another interconnection unit. Consequently, in each interconnection unit the condition of the external connections is fully known, so that subsequently the interconnections for the reconfiguration can be unambiguously established.

When each interconnection unit transmits its own test information via each outgoing line, usually an appreciable amount of time will be required. This is because the transmission of the test information via various lines, and also the evaluation of the test information arriving via several incoming lines, generally can only be performed consecutively instead of simultaneously. To limit the required amount of time, in a further embodiment of the invention, the detector device in each interconnection unit preferably connects the connection lines of at least one data connection so that any test information received from another interconnection unit is returned thereto. Thus, each test information transmitted tests two lines, i.e. an outgoing line and the associated incoming line.

In the prior art in which only one of the two transmission paths is used in the non-disturbed state, an internal delay time compensation must be performed. In the case of a disturbance this compensation may have to be changed. The necessity of such a delay time compensation and hence the adaptation thereof is avoided, in yet another embodiment. To accomplish this one of the transmission paths interconnecting all interconnection units serves as a write channel, only for the transmission of transmitted, but not yet evaluated data. At the same time, the other path serves as a read channel which is connected to the end of the write channel after the latter has passed through all interconnection units. The other path serves only for the transmission of the data which is transmitted by all interconnection units in order to be processed. In such an arrangement, delay time problems will no longer occur. Delay time compensation will not be required under any circumstances. Furthermore, such an arrangement enables simple control of the lines of the data connections and the synchronization device in each interconnection unit. In case of disturbance, with interconnection units which each comprise only two data connections, the connection between the two transmission paths preferably takes places in that interconnection unit which has not received correct test information. Such test information arrives via the write channel after detection of a disturbance of the data stream. In that same interconnection unit, the write channel is connected to the synchronization device and the read channel is connected to a termination element. It can thus be simply determined in which interconnection unit it is necessary to connect the synchronization device to the write channel and to interconnect the two data paths.

A further embodiment which utilizes separate write and read channels is characterized in that each data connection comprises a write channel as well as a read channel. Each such channel comprises two connection lines: one to receive a data stream via an incoming line from another interconnection unit; and another to transmit a data stream via an outgoing line to the same interconnection unit. The data path covers all interconnection units thus being formed in which the write channel and the read channel extend separately in parallel. The detector device in each interconnection unit transmits the test information upon detection of a disturbance of the data stream via the outgoing line of the write channel of all data connections. The detector device also evaluates the test information arriving via the incoming lines of both channels of all data connections. The detector device interconnects the lines of the data connections with other lines only when the external connections to both lines of both channels have been determined to be in order. Thus, the selection of the interconnection unit, in which the synchronization device is connected to the outgoing line of the write channel, is no longer dependent on the end of the transmission path. Other criteria can be used. This is more attractive for many applications, as will be explained hereinafter.

In yet a further embodiment of the arrangement in according with the invention such a further criterion is used. This criterion involves assigning a different sequence number to each interconnection unit of the arrangement. Each interconnection unit transmits its own sequence number. This sequence number is contained in the test information. Each interconnection unit also evaluates the sequence numbers contained in the test information received from the other interconnection units. The sequence number makes it possible to determine the interconnection unit which is connecting its internal synchronization device to the outgoing write line of a data connection.

In the case of multiple disturbances, the prior art attempted reconfigurations of at least one data transmission path to interconnect as many interconnection units as possible. It is known (for example, for DE-PS No. 25 52 953 or from IBM Technical Disclosure Bulletin Vol. 21, No. 8, January 1979, pages 3349 to 3350) to provide each interconnection unit with more than two data connections. Notably additional data transmission paths are formed which each skip one or more neighbouring interconnection units. For performing the reconfiguration the latter publication proposes a central unit. In DE No. 25 52 953, in each interconnection unit, a common internal data junction is switched over from one incoming line to another incoming line, when the data stream on the one incoming line is interrupted. The common data junction is permanently connected to at least two separate outputs. However, in these known arrangements an extensive reconfiguration is possible only if the disturbed locations exhibit a given distribution. In addition, for each interconnection unit four data connections are required. Moreover, it is not disclosed how a reconfiguration may be obtained when the loop, including all branch connections, is completely interrupted in a location. Furthermore, the above arrangements also require delay time compensation.

In a still further embodiment of the invention the case of an arbitrary distribution of disturbed locations is dealt with. In this embodiment, all interconnection units which are interconnected via a respective data connection can form a complete reconfiguration for data transmission by means of at least one continuous write channel and read channel. This data transmission does not require delay time compensation. The embodiment is characterized in that when each interconnection unit comprises at least three data connections, in the non-disturbed state a group of interconnection units always forms at least one closed data transmission path via two of the data connections. The further data connections are connected to corresponding data connections of other groups. Incoming line connections in each interconnection unit are connectable to the corresponding outgoing line connection of only one data connection. The transmission paths through each pair of groups form, via further data connections through one interconnection unit in each group, a data transmission path which passes through all groups. Upon detection of a disturbance of the data stream, test information is transmitted via each line by one of the two interconnection units connected thereto. The detector device in each interconnection unit connects the incoming and outgoing line connections depending on: whether the correct test information has been received on the data connections; the content of the test information; and which data connection the data stream from a synchronization device of an interconnection unit appears on first after the transmission of all test information. The detector devices connect the incoming and outgoing line connections so that at least one data transmission path is formed via all interconnection units which are interconnected via at least one data connection. The interconnection unit which does not receive a sequence number, in any test information which is lower than its own sequence number, then connects its internal synchronization device to the outgoing write line of a predetermined data connection if at the same time all transmission channels or lines of the predetermined data connection are in order.

Consequently, even if each group of interconnection units is multiply interrupted a coherent reconfiguration can still be obtained. In other words two separate sections of one group still communicate with at least one coherent section of the other group. The reconfiguration without a central unit is possible notably because each interconnection unit comprises its own synchronization device. This synchronization device can be connected, independently of the interconnection units, as required in accordance with the results of the test procedure which is performed in each interconnection unit for all data connections. Furthermore, by using the sequence numbers, it can be unambiguously determined which interconnection unit must supply the synchronization information.

This can be understood by considering a first interconnection unit which is connected to three other interconnection units. Suppose this first interconnection unit receives a sequence number, lower than its own sequence number, along with test information from one of the other interconnection units. The first interconnection unit then knows that it need not generate the synchronization information. Whether the other interconnection unit having the lower sequence number will actually generate the synchronization information or whether this will be done by a further interconnection unit, connected to the other and which has a sequence number which is even lower, is irrelevant to the first interconnection unit. There will always be only one interconnection unit which does not receive test information from other interconnection units of lower sequence number. This relevant interconnection unit will be informed and this will be sufficient for this purpose. It will be apparent that neighbouring interconnection units are assigned sequence numbers in a monotonously ascending order.

Another further embodiment of the described arrangement is characterized in that each interconnection unit comprises, for each incoming line of the write channel and the read channel, a switch which is controlled by the detector device. The switch also connects said incoming line to an outgoing line of the same channel of only one data connection, including the data connection associated with the relevant incoming line. The switches of all incoming lines are connected so that each outgoing line is connected to at the most one incoming line. The outgoing line of the write channel of a predetermined data connection is switchable from the outputs of the switch to the input of the synchronization device. The outgoing line of the read channel of the predetermined data connection is connected to a further switch. The further switch connects the relevant outgoing line of the read channel to an incoming line of the write channel of one of the data connections. This arrangement of switches enables the connections required for the reconfiguration to be established extremely quickly.

The reconfiguration is somewhat time-consuming with interconnection units, which comprise at least three data connections and which are interconnected in groups in a substantially closed loop, when several disturbances occur simultaneously via all interconnection units which can still be connected. Moreover, during this time sections of the original arrangement are not yet available for data transmission. Yet another further embodiment prepares sub-arrangements for data transmission more quickly in such cases. The interconnection of the sub-arrangements takes place subsequently. This embodiment relates to the case of: at least three data connections per interconnection unit, and the formation of a respective write channel and a read channel for each interconnection unit, which together cover all interconnection units using two selected data connections of each interconnection unit. The third data connection of at least a fraction of the interconnection units is connected to a corresponding data connection of remote interconnection units in the non-disturbed case. After detection of a disturbance of the data stream and of the transmission and evaluation of the test information, a write channel and a read channel are formed for all interconnection units connected via non-disturbed connections between the selected data connections. In this way said interconnection units are interconnected. The connection of the synchronization device to the write channel in the interconnection unit takes place at the beginning of the write channel. The connection between the write channel and the read channel in the interconnection unit takes place at the end of the write channel. Afterwards test data is exchanged via the further data connections of interconnection units which have been determined to be in order. Said test information contains the sequence numbers of the associated interconnection units in which the synchronization device is activated. Then the two groups having the lowest sequence numbers are interconnected so as to form a common data transmission path. In other words the synchronization device is activated only in the interconnection unit having the overall lowest sequence number. The described procedure is repeated until all interconnection units which have at least one common connection have been interconnected so as to form a common write and read channel. Thus, first sub-arrangements for data transmission are formed from interconnected interconnection units of a group. Once said sub-arrangements are operational, the testing of the connections between sub-arrangements of different groups is performed. A step-wire structure is thus obtained. Consequently, the sub-arrangement within which data transmission is possible is step-wise enlarged. Data transmission, independent of the other sub-arrangements, is possible in the sub-arrangements not yet connected.

BRIEF DESCRIPTION OF THE DRAWINGS

Embodiments in accordance with the invention will be described in detail hereinafter with reference to the drawing. Therein.

DETAILED DESCRIPTION OF THE PREFERRED EMBODIMENTS

Figure 1:
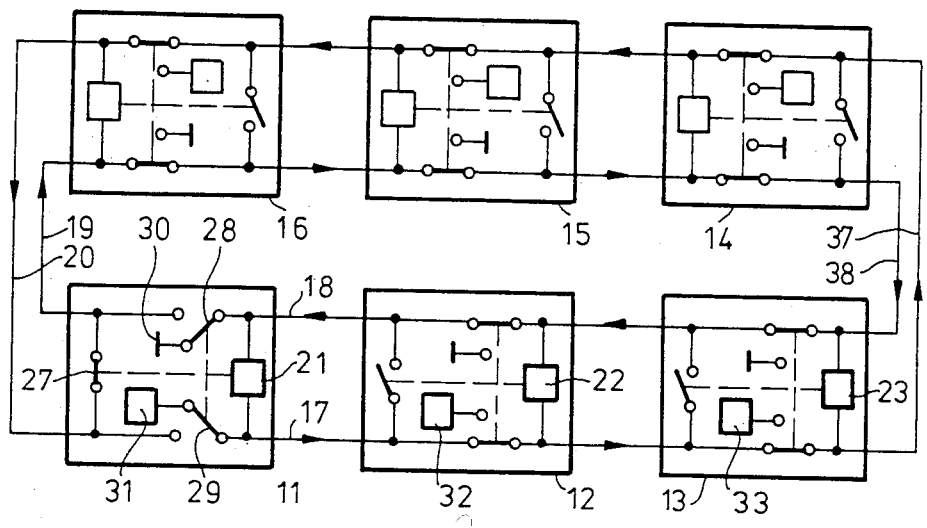
FIG. 1 shows an arrangement consisting of interconnection units comprising only two data connections in the non-disturbed state.

FIG. 1 shows six interconnection units 11 to 16. Each unit comprises two data connections. Each data connection is connected to neighbouring interconnection units via two connections. For example, one data connection of the interconnection unit 11 is connected to a data connection of the interconnection unit 12 via connections 17 and 18. The other data connection of the interconnection unit 11 being connected to the interconnection unit 16 via the connections 19 and 20. The peripheral apparatuses which are connected to the individual interconnection units and which receive and/or output data have been omitted for the sake of clarity, because they are irrelevant to the present invention. The directions of the data streams on the two connections between each pair of interconnection units are always opposed as indicated by the arrows on these connections.

Furthermore, input amplifiers and output amplifiers (not shown) are connected to the data connections of each interconnection unit. The connections between the interconnection units need not be electrical connections, but may also be optical connections utilizing light conductors, each input amplifier then comprising a light-sensitive element such as a photodiode and each output amplifier comprising, for example a laser diode. However, this will not be elaborated upon hereinafter because it is irrelevant for the present invention.

Each of the interconnection units 11 to 16 comprises a synchronization device 31, 32, 33 etc. for generating synchronization information. Said devices generate a constant data stream comprising periodic synchronization signals. Furthermore, each interconnection unit comprises three switches, i.e. the switches 27, 28 and 29 of the interconnection unit 11. Moreover, each interconnection unit also comprises a detector device 21, 22, 23 etc., the detector device 21 of the interconnection unit 11 monitoring the data stream on the connections 17 and 18. Furthermore, each of the interconnection units 11 to 16 also comprises a data device (not shown). This data device either transfers the data output by the peripheral apparatus (not shown) to the connections leading to the other data devices; or takes up the data from the connections originating from the other interconnection units for supply to the peripheral apparatus.

The switch 29 in the interconnection unit 11 is connected so that the synchronization information transmitted by the synchronization device 31 is transferred, via the connection 17. to the interconnection unit 12. From there, the synchronization information is transferred successively to the other interconnection units 13 to 16 and finally back to the interconnection unit 11. The connection 17 and the corresponding connections between the other interconnection units thus represent a write channel on which the data is only written but not yet processed. The synchronization information transmitted by the synchronization device 31 marks a number of time slots in the write channel. An interconnection unit wishing to transmit a message checks the write channel for the presence of a free time slot and transmits its message therein. All messages transmitted by all interconnection units are thus present on the line 20 arriving at the interconnection unit 11.

In the interconnection unit 11 the connection 20 is connected to the switch 27, shown closed. The connection 20 is subsequently coupled, via the connection 19, to the interconnection unit 16 and then successively to all other interconnection units 15 to 11. The circulating data is in this case complete, i.e. no additional data is added in any interconnection unit. This data is merely evaluated in the individual interconnection units. This means that each interconnection checks whether a message in a time slot comprises its own address. The connections 18, 19 and the corresponding connections (not numbered) thus represent the read channel. This channel ultimately extends, via the connection 18, to the interconnection unit 11. In the interconnection unit 11, the switch 28 is connected so that the data received is applied to a termination 30. Thus, in the arrangement shown in FIG. 1 each interconnection unit can transmit a message to any other interconnection unit.

As shown in FIG. 1 all interconnection units in principle have the same priority. Thus, it is arbitrary in which interconnection unit: the synchronization device is connected to the outgoing write channel, the incoming write channel is connected to the outgoing read channel, and the incoming read channel is connected to a termination. The selection of the interconnection unit 11 in FIG. 1 can be made, for example, when the arrangement is installed.

It will now be assumed that a disturbance occurs, for instance an interruption of one of the connections 37 or 38, in other words both connections between the interconnection units 13 and 14. When the connection 37 is interrupted, the interconnection units 14 to 16 immediately cease to receive data via the write channel. Via the switch 27 and the connection 19, the supply of data to the read channel is also stopped. This is detected after a given delay by the interconnection units 13, 12 and 11, when only the connection 37 is interrupted and the connection 38 is still in order. The latter interconnection units 13, 12, 11 immediately detect a data failure on the read channel only when the interconnection 38 is interrupted. In the latter case the transmission of synchronization information by the synchronization device 31 in the interconnection unit 11 is interrupted. The interconnection units 14 to 16 are thus also informed about an interruption in the read channel, for example in the connection 38. Thus, after a given delay each interconnection unit will in any case have detected that a disturbance has occurred.

Figure 2:
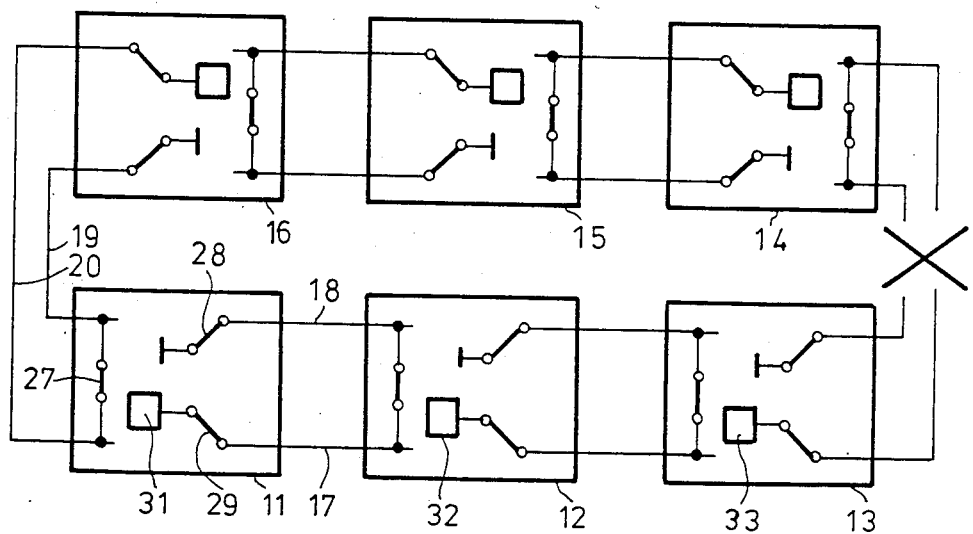
FIG. 2 shows the test configuration of the arrangement shown in FIG. 1 when an interruption of the data stream occurs.

Subsequently, all interconnection units 11 to 16 assume the state shown in FIG. 2, i.e. the outgoing write channel in each interconnection unit is connected to the synchronization device 32 which now, however, transmits test information. The incoming read line is connected to the termination and the incoming write line to the outgoing read line. Thus, closed data loops are formed which extend from a respective interconnection unit via the neighboring interconnection unit and back again. For example, the interconnection unit 11 can now test whether the test information transmitted by the synchronization device 31 via the connection 17 correctly arrives again via the connection 18. Moreover, it can also be tested whether further test information is transmitted via the switch 27. When this is the case, the interconnection unit 11 will know that the connections 17, 1B and 20 are non-disturbed.

However, an interruption could be present in the connection 19 which interruption cannot be easily detected by the interconnection unit 11. However, when this connection 19 is non-disturbed, the interconnection unit 16 receives its test information again and subsequently transmits acknowledge information which is received by the interconnection unit 11. The interconnection 11 will then also know that the connection 19 is in order. The same is applicable to the other interconnection units.

Figure 3:
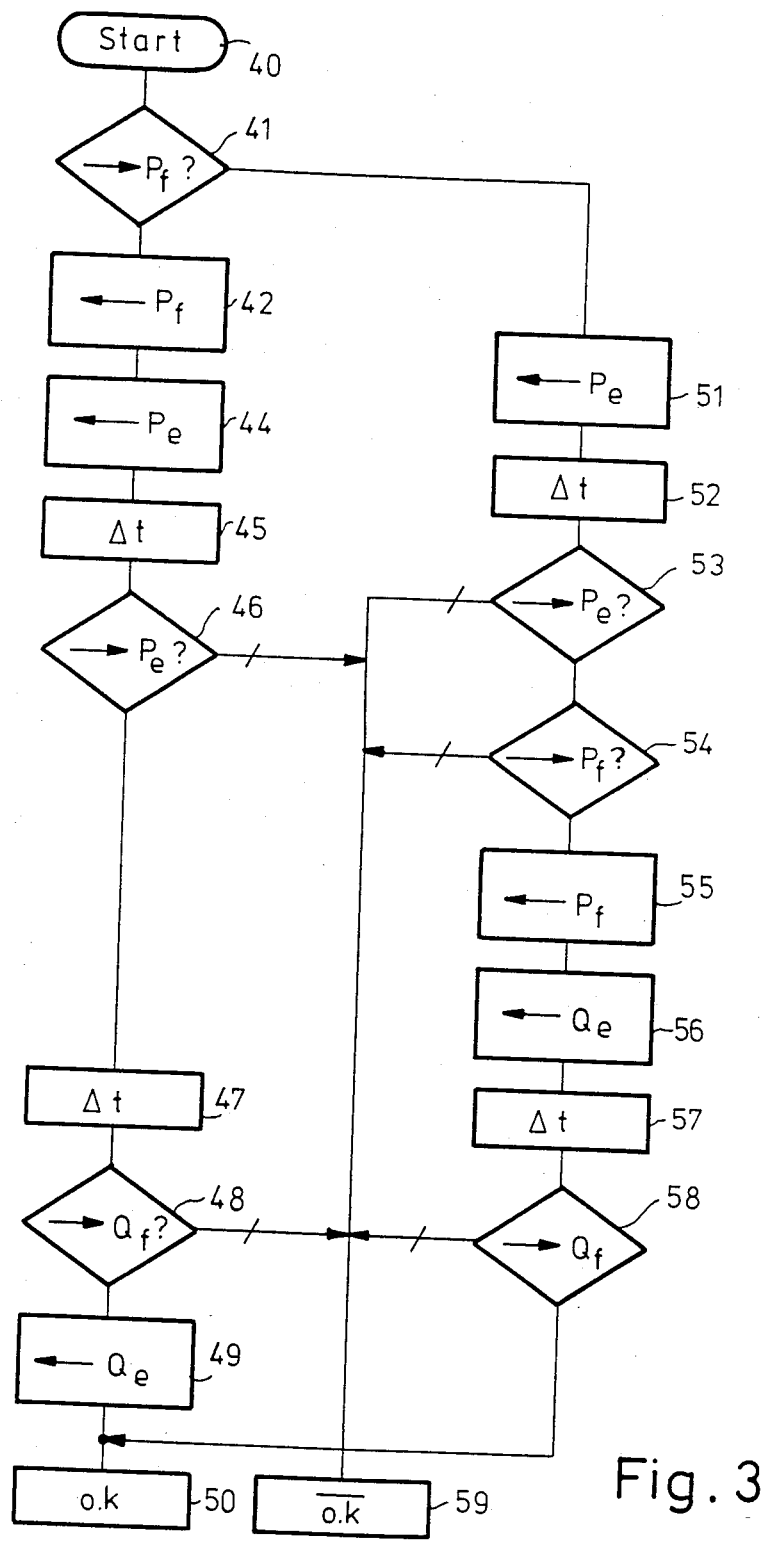
FIG. 3 shows a flowchart for testing the state of the connections connected to a data connection of an interconnection unit.

The testing of the data connections of an interconnection unit after detection of an interruption of the data stream is shown in a flowchart in FIG. 3. The starting point 40 is a predetermined period of time after detection of the interruption of the data stream of the write channel and/or the read channel. Whether test information is received from another interconnection unit is then tested 41. When this is the case, the test information is returned 42. It will be apparent that the fact that an external test information has been received is stored in memory. If the test information transmitted by another interconnection unit also contains the sequence number thereof, this number is also stored.

Subsequently, the interconnection unit's own test information is transmitted 44. The expiration of a predetermined waiting period is tested 45. The waiting period corresponds to the time delay caused by the transmission of the test information, via the connections, to another interconnection unit and the processing therein. Block 46 represents a testing of whether the interconnection unit's own information has been received again from the other interconnection unit before expiration of the waiting period. When this is not the case, one of the two connections involved or the other interconnection unit is disturbed and the test procedure is terminated after block 59. The relevant data connection of the interconnection unit is stored 59 as being disturbed. In the case of the interconnection unit 11 this means that either the connection 17 or the connection 18 or the interconnection unit 12 is defective. In principle, any data connection where only one connection is disturbed is deemed to be defective and is not used for the subsequent reconfiguration.

However, reception of the interconnection unit's own test information in block 46 means that, for example with respect to the interconnection unit 11, the connections 17 and 18 as well as the corresponding data connection and the path in the interconnection unit 12 are in order. In the case of a positive response to the interrogation in the block 41, it has already been established that the connections 20 and the associated section of the interconnection unit 16 are in order. When the connection 19 is also in order, the interconnection unit 16 will subsequently transmit acknowledge information via the connection 20. The acknowledge information is received in the interconnection unit 11, for example at the switch 27, after a corresponding waiting period. This waiting period is completed in the block 47. Whether the acknowledge information has arrived from the other interconnection unit is then tested 48. If this information does not arrive, the connection 19 is interrupted in the case of the interconnection unit 11. In other words, the interconnection unit 16 has not received its test information back again so that it has not transmitted acknowledge information either. The procedure is then again terminated after storage 59 of the fact that the data connection is disturbed. In the case of the interconnection unit 11 the relevant disturbed data connections would be 19 and 20.

However, when the acknowledge information is received 48 from the other interconnection unit, the interconnection unit's own acknowledge information will be transmitted 49. This informs the corresponding other interconnection unit, i.e. the interconnection unit 12 in the case of the interconnection unit 11, that the connection 18 is also in order. The test procedure is subsequently terminated after block 50. Block 50 represents storage of the fact that both data connections, and also the corresponding parts of the neighbouring interconnection units, are in order.

When no test information from another interconnection unit is detected at block 41, the corresponding connection is interrupted or the other interconnection unit transmits the test information only later. In this case the interconnection unit's own test information is transmitted 51. The interconnection unit then tests for the expiration of a predetermined waiting period in block 52, corresponding to the waiting period in block 45. In block 53 the interconnection unit tests whether its own test information has been received again. When this is not the case, the test procedure is terminated via the block 59. When the interconnection unit's own test information has been received again, it has been determined that: the outgoing write channel, the incoming read channel, and the other interconnection unit connected thereto are in order. Then the arrival of the test information from the other interconnection unit is awaited 54. Failure of this test information to arrive means that the relevant data transmission path or the other interconnection unit is disturbed. The test procedure is then again terminated and the fact of the existence of the disturbance is stored again 59. When the test information from the other interconnection unit has arrived, it is returned thereto in block 55. Subsequently, the interconnection unit's own acknowledge information is transmitted in block 56. For the sake of completeness it is noted that this acknowledge information need not be returned or evaluated by the other interconnection unit and no processing step is provided for this purpose.

In block 57 the expiration of a waiting period corresponding to the waiting period in block 47 is tested. This waiting period corresponds to the delay until the test information returned in block 55 has initiated the transmission of acknowledge information. Block 58 indicates the testing of whether the acknowledge information from the other interconnection unit has arrived after expiration of this waiting period. When this is no the case, the corresponding outgoing read line is disturbed and the test procedure is terminated via the block 59. This termination is analogous to the negative decision branch stemming from block 48. However, when the acknowledge information is received from the other interconnection unit, the test procedure is terminated via the block 50. The fact that all data connections or connections and the corresponding parts of the neighbouring interconnection units are in order is stored 50.

Figure 4:
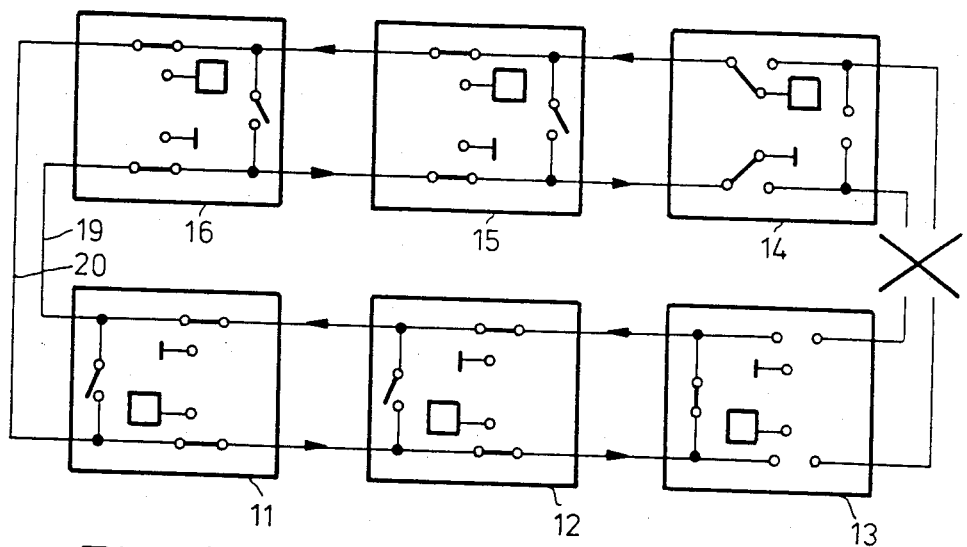
FIG. 4 shows an arrangement as shown in FIG. 1 after reconfiguration due to a disturbance.

Depending on the result of the test in each interconnection unit, this interconnection unit sets its switches 27, 28 and 29. In this way a reconfiguration of the arrangement is obtained in which all interconnection units are again interconnected via a write channel and a read channel as shown in FIG. 4. The interconnection unit 14 has detected that one of the two connections 37 or 38 or both are interrupted because it has not received test information via these connections. As a result the synchronization device 34 is connected to the outgoing write channel and the incoming read channel is connected to the termination. The interconnection units 15, 16, 11 and 12 have each determined that the connections of both data connections are in order. Therefore their respective write channels and read channels are interconnected. The interconnection unit 13, however, has established, like the interconnection unit 14, that at least one interruption is present in the connections 37 and 38. Connections 37 and 30 form the outgoing write channel and the incoming read channel for the interconnection unit 13. Therefore the interconnection unit 13 closes its switch corresponding to switch 27, thus establishing a connection between the write channel and the read channel. It will be apparent that for the described reconfiguration it is unimportant in which location the interruption occurs. Only the interconnection unit in which the synchronizing device is connected to the outgoing write channel could change. When an interruption occurs because an interconnection unit becomes defective, for example the outgoing write channel or the incoming read channel of the interconnection unit 13, the same steps are taken. However, when the interconnection unit 13 is defective to such an extent that the information on the incoming write channel cannot be transmitted via the outgoing read channel, the consequences for the interconnection unit 12 will be the same as if an interruption were present in the connection between the interconnection units 12 and 13. The interconnection unit 12 then assumes the switch position shown for the interconnection unit 13. The interconnection unit 13 is then completely skipped.

Should one or both of the connections lg or 20 also comprise an interruption in the arrangement shown in FIG. 4, the arrangement will be divided into two sections. Each of the two sections will be fully operational but, of course, they will not be able to communicate with one another any longer.

Figure 5:
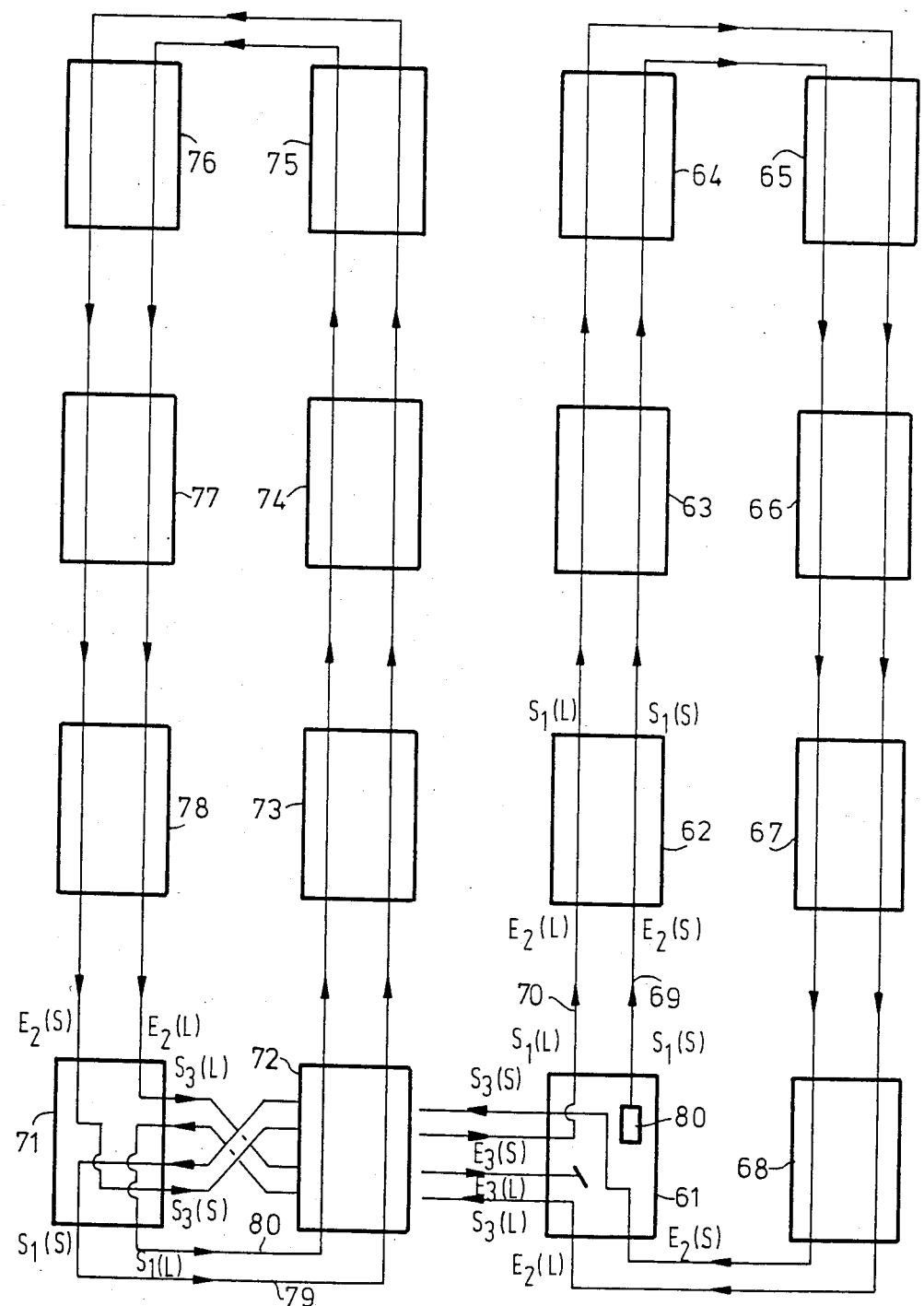
FIG. 5 shows an arrangement of interconnection units which comprise three data connections.

FIG. 5 shows an arrangement which in most cases enables complete reconfiguration of the transmission path through all interconnection units in the event of several defects. This arrangement comprises two groups of interconnection units: A first group comprising the interconnection units 61 to 68, and a second group comprising the interconnection units 71 to 78. Each of the interconnection units comprises three data connections. The three data connections are shown only for the interconnection units 61 and 71 because it is only therein that they ar required for the formation of a complete data transmission path through all interconnection units in the non-disturbed case initially assumed for FIG. 5. For the other interconnection units 62 to 68 and 72 to 78 only two data connections are shown. Actually the third data connection of, for example, the interconnection unit 62 is connected to the third data connection of the interconnection unit 78. Similarly, the third data connection of the interconnection unit 68 is connected to the interconnection unit 72. The same is applicable to all other interconnection units.

Each data connection comprises four lines. In FIG. 5, however, the four lines are only shown completely for the third data connection of the interconnection units 61 and 71. The reference letters and numerals of the four lines at this third data connection have the following meaning (the subscript representing the number of the data connection):

$S_3(S)$—outgoing or transmitting line of the write channel,
$E_3(S)$—incoming or receiving line of the write channel,
$S_3(L)$—outgoing or transmitting line of the read channel,
$E_3(L)$—incoming or receiving line of the read channel.

For the first and second data connections of all interconnection units, only two lines are shown, that is to say the lines $S_1(S)$ and $S_1(L)$ for the first data connection of the interconnection unit 61. These lines are connected via connections 69 and 70, to the incoming lines $E_2(S)$ and $E_2(L)$, respectively, of the interconnection 62. The line $S_1(S)$ of the interconnection unit 61 is in this case connected to the synchronization device 80; it is to be noted that such a synchronization device is included in each of the other interconnection units, but is not used therein, so that it has been omitted for the sake of simplicity. The data transmission path departing from the synchronization device 80 extends via the connection 69 through the interconnection unit 61 and subsequently through the further interconnection units 61 to 68 and back to the interconnection unit 61 again via the incoming line $E_2(S)$ thereof. The data transmission path represents a write channel which interconnects all interconnection units 61 to 68 of the first group. The second data transmission path which departs from the interconnection unit 61 also interconnects all the interconnection units 61–68. This second data transmission path extends via the line $S_1(L)$ and the connection 70 through the interconnection unit 62 and the further interconnection units 63 to 68 in the same direction as the write channel. The second data transmission path subsequently enters the interconnection unit 61 again via the line $E_2(L)$. This second path represents a read channel. Similarly, in the second group of interconnection units 71 to 78, the data transmission path which departs from the interconnection unit 71 and which extends, via the line $S_1(S)$ and the connection 79, through the interconnection unit 72 and subsequently through all other interconnection units 73 to 78 and back again to the interconnection unit 71, represents the write channel of the second group. Similarly, the transmission path starting from the line $S_1(L)$ of the interconnection unit 71 and extending through all interconnection units of this group via the connection 80 represents the read channel of this group. The write channel 69 of the first group is split in the interconnection unit 61 and connected, via the line $S_3(S)$, to the interconnection unit 71. Similarly, the write channel 79 of the second group is split in the interconnection unit 71 and the return write channel is connected via the line $E_3(S)$, to the interconnection unit 61 of the first group.

If the line $E_3(S)$ were coupled to the line $S_1(S)$ inside the interconnection unit 61, as in the arrangements known from the prior art discussed in the preamble, a fully closed transmission path would be obtained. Via this path any interconnection unit could exchange messages with any other interconnection unit of the same group or the other group. The read channel 70 or 80 could then be used as a spare channel in the case of a reconfiguration necessitated by disturbances. In that case, however, the direction of the data would have to be reversed in comparison with the direction shown. In this case only two lines per data connection would be required in each interconnection unit.

Hereinafter, however, it is assumed that the read channel and the write channel are separated as has already been described with reference to FIG. 1. To this end, the write channel, after having passed through all interconnection units at least once, is connected to the outgoing read channel $S_1(L)$ when it arrives at the line $E_3(S)$ in the interconnection unit 61, i.e. to the read channel which subsequently also passes through all interconnection units at least once. When the read channel again arrives in the interconnection unit 61 via the line $E_3(L)$, it is connected to a termination.

It will be apparent that in FIG. 5 the connections of the third connections of the interconnection units 62 to 68 and 72 to 78 are not the only connections which are not shown. In addition the first and the second data connections are not shown, that is to say parallel to the write channel 69 to 79 and parallel to the read channel 70 to 80. Data transmission in those lines which are not shown is required only in the case of a disturbance. Such data transmission would be the direction opposite to the write channel 69, 79 and the read channel 70, 80.

A disturbance may occur in the arrangement shown in FIG. 5 due to interruption of a connection of a connection or a defect in an interconnection unit. In such a case the information stream transmitted by the synchronization device 80 is interrupted. All interconnection units will then recognize such an interruption. There will merely be a delay in the recognition which depends on the location where the failure occurs. All interconnection units will then enter a test state as shown in FIG. 6.

Figure 6:
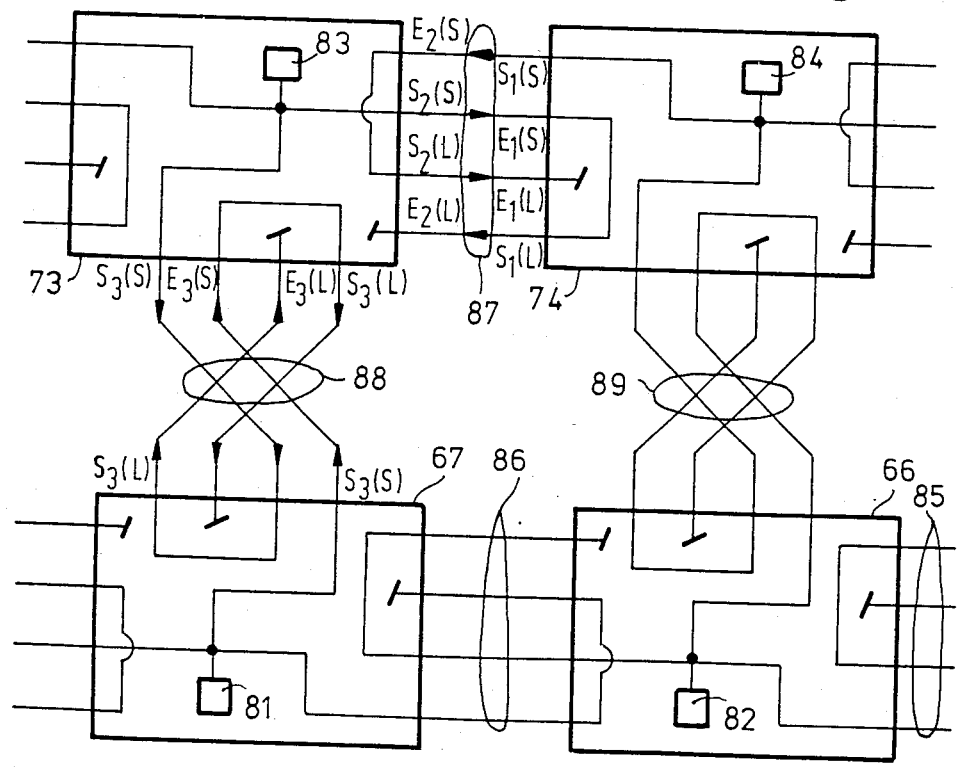
FIG. 6 shows the test configuration of some arrangements as shown in FIG. 1 when an interruption of the data stream is detected.

FIG. 6 shows four interconnection units. The interconnection units 66 and 67 form part of the first group. The interconnection units 73 and 74 form part of the second group. All four connections of each data connection of these interconnection units to one another and to the neighbouring interconnection units (not shown) are fully represented. In each of the connection bundles 86 to 89, an outgoing write line $S_x(S)$ is connected to the incoming write line $E_x(S)$ of the other interconnection unit. The outgoing read line $S_x(L)$ is connected to the incoming read line $E_x(L)$ of the other interconnection unit. The index x denotes the number of the data connection. The first data connection of an interconnection unit is connected to the second data connection of the other unit while the third data connections of each pair of interconnection units are connected. For realizing the connections of the individual lines shown, a double-crossing of connections occurs in the connection of the third data connections, as indicated for the connection bundles 88 and S9. No crossing of the individual connections occur in the connection bundles 86 and 87, because the sequence of the lines on the second data connection is chosen to be different from the sequence of the lines on the first data connection.

For all three data connections in each interconnection unit: the outgoing write line $S_x(S)$ is connected to the synchronization device 81, 82, 83, 84 respectively; and the incoming read line $E_x(L)$ is connected to a termination. Furthermore, in each interconnection unit the incoming write line $E_x(S)$ is connected to the outgoing read line $S_x(L)$ for each data connection. Consequently, each interconnection unit receives the test information, transmitted via an outgoing write line $S_x(S)$, on the incoming read line $E_x(L)$ of the same data connection, when the two relevant connections are in order. Furthermore, on each incoming write line $E_x(S)$, test information is received from another interconnection unit when the relevant connection is in order. This information is returned via the outgoing read line $S_x(L)$. All in all a test procedure as described with reference to FIG. 3 is performed for each data connection. After termination of the test procedure, the state of all four connections of each data connection is known in all interconnection units. For example, for the interconnection 66 the state of all connections in the connection bundles 85, 86 and 89 is known. The state of the connections includes the state of the two interconnection units or the relevant section connected by the connections. Moreover, after termination of the test procedure it will be known for each interconnection unit whether one of the neighbouring interconnection units has a higher or a lower sequence number.

At this point all interconnections units have been informed about the state of the connections at each of their three respective data connections. However, the final interconnections of the individual lines of the three data connections cannot be completely established until after a determination of the sequence of the first synchronization information and a determination of which data connections the first synchronization information arrives at. The synchronization information is generated by the interconnection unit in which at least the first data connection is in order and which has the lowest sequence number. This means that the interconnection unit has not found any neighbouring interconnection unit having a lower sequence number. The synchronization device of the appropriate interconnection unit is then connected to the line $S_1(S)$. The synchronization information transmitted via this line then passes through a series of interconnection units whose number and sequence depend on the position of the relevant disturbed locations. As a result, the synchronization information returns to the unit that originally generated it. It returns via the incoming line of the write channel of one of the data connections. It will be apparent that this particular write channel can only be a non-disturbed data connection. However, it may occur that the synchronization information returns before having passed through all interconnection units which still cohere by way of at least one data connection. If this occurs the returned synchronization information must still be transmitted to the other interconnection units via an outgoing line of a data connection. However, when the synchronization information returns in the source interconnection unit after having passed through all interconnection units, it is applied to the read channel in the interconnection unit which generated the synchronization information. These different conditions are recognized, in the interconnection unit generating the synchronization, only on the basis of the data connection and the sequence in which the synchronization information arrives on an incoming write line. Subsequently, the individual interconnections inside the interconnection unit generating the synchronization information are established. The arrow indicates which incoming line is to be connected to which outgoing line. For the sake of clarity, only the lines of the write channel are indicated because the corresponding lines of the read channel are interconnected in exactly the same way. However, at the location where the incoming write channel is connected to the outgoing read channel, the incoming read channel is connected to a termination.

1. It will first be assumed that all three data connections of the interconnection unit generating the synchronization information are in order.

(1a) When the first synchronization information returns on the incoming lines $E_1(S)$ or $E_2(S)$ for the first time:

$E_1(S) \rightarrow S_2(S)$ $E_2(S) \rightarrow S_3(S)$ $E_3(S) > S_1(L)$ (1b) When the first synchronization information returns on the incoming line $E_3(S)$ for the first time, this line is connected to the outgoing line $S_2(S)$. The arrival of the synchronization information on such an input, however, signifies that not all feasible interconnection units have already been passed through and that the first synchronization information will arrive once more in the interconnection unit generating this information. As soon as this is the case, the input on which the synchronization information arrives for the second time is connected to the outgoing read channel. The other incoming write line on which no further synchronization information arrives and which is not included in the overall data path, can be connected to a termination in order to create predetermined conditions. In detail, the following interconnections are ultimately obtained:

(1b1) When the synchronization information arrives a second time via the line $E_2(S)$ $E_3(S) \rightarrow S_2(S)$ $E_2(S) \rightarrow S_1(L)$ $E_1(S) \rightarrow \text{termination}.$ (1b2) When the synchronization information arrives a second time via the line $E_1(S)$ $E_3(S) \rightarrow S_2(S)$ $E_1(S) \rightarrow S_1(L)$ $E_2(S) \rightarrow \text{termination}.$ 2. It is now possible, as in the case of a corresponding distribution of disturbed locations, that the second or the third data connection of the interconnection unit generating the synchronization information is defective. However, this is known in this interconnection unit as a result of the test procedure. As soon as the synchronization information returns once to the source interconnection unit on the incoming line of one of the two non-disturbed data connections, it is unambiguously determined that it must arrive a second time. The second arrival will be via the incoming line of the write channel of the other data connection. In this way the data paths to be interconnected are known at the same time. In individual cases interconnection is necessary.

(2a) If the data connection 3 is defective and:

(2a1) if the synchronization information arrives for the first time on the incoming line $E_1(S)$, then $E_1(S) \rightarrow S_2(S)$ $E_2(S) \rightarrow S_1(L);$ alternatively (2a2) if the synchronization information arrives for the first time on the incoming line $E_2(S)$, then $E_2(S) \rightarrow S_2(S)$ $E_1(S) \rightarrow S_1(L).$ (2b) If the data connection 2 is defective and:

(2b1) if the synchronization information arrives for the first time on the line $E_1(S)$, then $E_1(S) \rightarrow S_3(S)$ $E_3(S) \rightarrow S_1(L);$ alternatively (2b2) if the synchronization information on the line $E_3(S)$ arrives for the first time, then $E_3(S) \rightarrow S_3(S)$ $E_1(S) \rightarrow S_1(L).$ (2c) If the second and the third data connection are defective, then the data path to be connected is $E_1(S) \rightarrow S_1(L).$ All combinations of states which can occur in the interconnection unit generating the synchronization information have thus been taken into account. For each state, ultimately unambiguous interconnection of the data paths takes place.

For the other interconnection units which do not generate the synchronization information, the data paths to be interconnected are determined similarly. That is to say, the data paths are determined no later than upon the first arrival of the synchronization information unless the data paths to be interconnected are directly determined, e.g. where there are defects in data connections.

3. If all data connections are in order (3a) and the synchronization information arrives on the line $E_2(S)$ for the first time, then:

$E_2(S) \rightarrow S_1(S)$ $E_1(S) \rightarrow S_3(S)$ $E_3(S) \rightarrow S_2(S)$.

(3b) However, if the synchronization information appears for the first time on one of the lines $E_1(S)$ or $E_3(S)$, then:

$E_1(S) \rightarrow S_2(S)$ $E_2(S) \rightarrow S_3(S)$ $E_3(S) \rightarrow S_1(S)$.

4. However, if data connections are defective, the following interconnections of data paths take place:

(4a) if the data connection 1 is defective, then:

$E_2(S) \rightarrow S_3(S)$ $E_3(S) \rightarrow S_2(S)$;

(4b) if the data connection 2 is defective, then:

$E_1(S) \rightarrow S_3(S)$ $E_3(S) \rightarrow S_1(S)$;

(4c) if the data connection 3 is defective, then:

$E_1(S) \rightarrow S_2(S)$ $E_2(S) \rightarrow S_1(S)$; and (4d) if only one of the data connections is in order, the incoming write line is connected to the outgoing write line at this connection $E_x(S) \rightarrow S_x(S)$ The data connections to be established for all possible combinations of states of the data connections are thus unambiguously defined. As has already been described, the lines of the read channels are interconnected in the same way as the lines of the write channels.

FIG. 7 again shows the arrangement of FIG. 5, but the connections of the individual interconnection units and the data transmission path thus formed are shown after the reconfiguration initiated by disturbances occurring at the locations denoted by crosses. For the sake of simplicity it is assumed that the sequence numbers assigned to the interconnection units are the same as their reference numerals.

Because the interconnection unit 61 has the lowest sequence number and no disturbance has occurred on its first data connection, this interconnection unit remains the unit whose synchronization device 80 generates the synchronization information. Furthermore, it can be deduced from FIG. 7 that the second and the third data connection of the interconnection unit 61 are also in order. Thus, the conditions mentioned in numbered paragraph 1 hold for the interconnection of the data paths within the interconnection unit 61, i.e. the interconnection unit 61 must wait to see at which data connection the synchronization information appears again for the first time.

The synchronization information transmitted via the line $S_1(S)$ is first applied to the input $E_2(S)$ of the interconnection unit 62. It has been assumed that the third data connection thereof, i.e. the connection to the interconnection unit 78, is disturbed. Therefore interconnection condition 4c holds for the interconnection unit 62. In other words all lines of the second data connection are connected to the corresponding lines of the first data connection. From the line $S_1(S)$ of the interconnection unit 62 the synchronization information then proceeds to the connection $E_2(S)$ of the interconnection unit 62 in which, however, the data connection 1 is disturbed. Consequently, this interconnection unit is subject to condition 4a. Therefore all lines of the second data connection are connected to the corresponding lines of the third data connection. Consequently, the synchronization information is applied from the interconnection unit 63, via the line $S_3(S)$, to the line $E_3(S)$ of the interconnection unit 77. Because the first as well as the second data connection thereof is defective, this unit is subject to the interconnection condition 4d. In this way, the synchronization information returns to the line $E_1(S)$ of the interconnection unit 61 via the line $S_3(S)$ of the interconnection unit 77 and the interconnection units 63 and 62. Consequently, the interconnection unit 61 is subject to the interconnection condition 1a, i.e. the returned synchronization information is applied to the interconnection unit 68 via the line $S_2(S)$.

Figure 7:
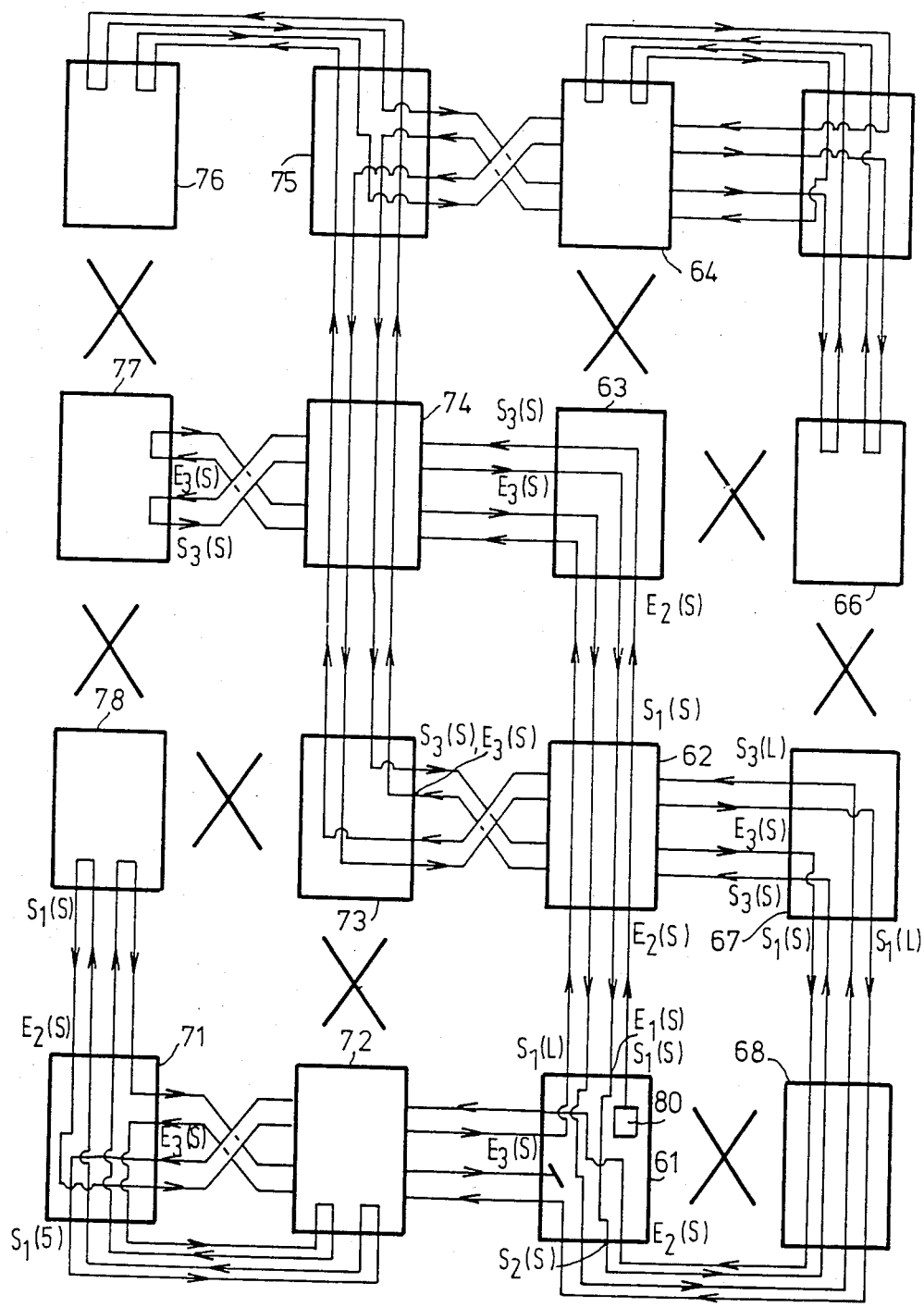
FIG. 7 shows an arrangement as shown in FIG. 5 after reconfiguration due to several, simultaneously occurring disturbed locations.

The interconnection conditions for the other interconnection units can be found similarly. Ultimately, the data transmission paths shown in FIG. 7 are formed. As shown there, a complete write channel is formed which commences at the interconnection unit 61, extends through this unit again after return on the line $E_1(S)$, and ultimately returns to the interconnection 61 from the interconnection unit 71 on the line $E_3(S)$. The write channel terminates in interconnection unit 61 and is connected to the beginning of the read channel. The read channel commences via the output $S_1(L)$ and which extends through all interconnection units parallel to the write channel. The described interconnection conditions thus enable a reconfiguration of the arrangement to be obtained even in the case of a large number of disturbed locations. All interconnection units which have at least one data connection which is connected to other interconnection units are then involved in the common data transmission path. In the case of certain disturbances, for example in the connection between the interconnection units 62 and 63, only one connection can be established between the latter unit and the interconnection unit 77 so that messages can be exchanged between these two interconnection units. However, in this case connection to the other interconnection units is no longer possible.

A corresponding reconfiguration of a transmission path which includes as many interconnection units as possible is also feasible. For example, in the non-disturbed case two fully separated groups of interconnection units may be present. In this case, one group may serve for the transmission of data, while the other group serves for the transmission of digitized speech information. The connection between the interconnection units 61 and 71, for example, in FIG. 5, therefore, would not be used initially. In the interconnection unit 61, the incoming line $E_2(S)$ of the write channel would then be initially connected to the outgoing line $S_1(L)$ of the read channel. The interconnection unit 71 would be connected in exactly the same way. It is only when a multiple disturbance in at least one of the groups inhibits data transmission between all interconnection units that the connections of the interconnection units of different groups via the third data connections are used. In this way, a data path is formed which covers all interconnection units in the described manner. In this case, data as well as digital speech is transmitted via the third data connections.

Figure 8:
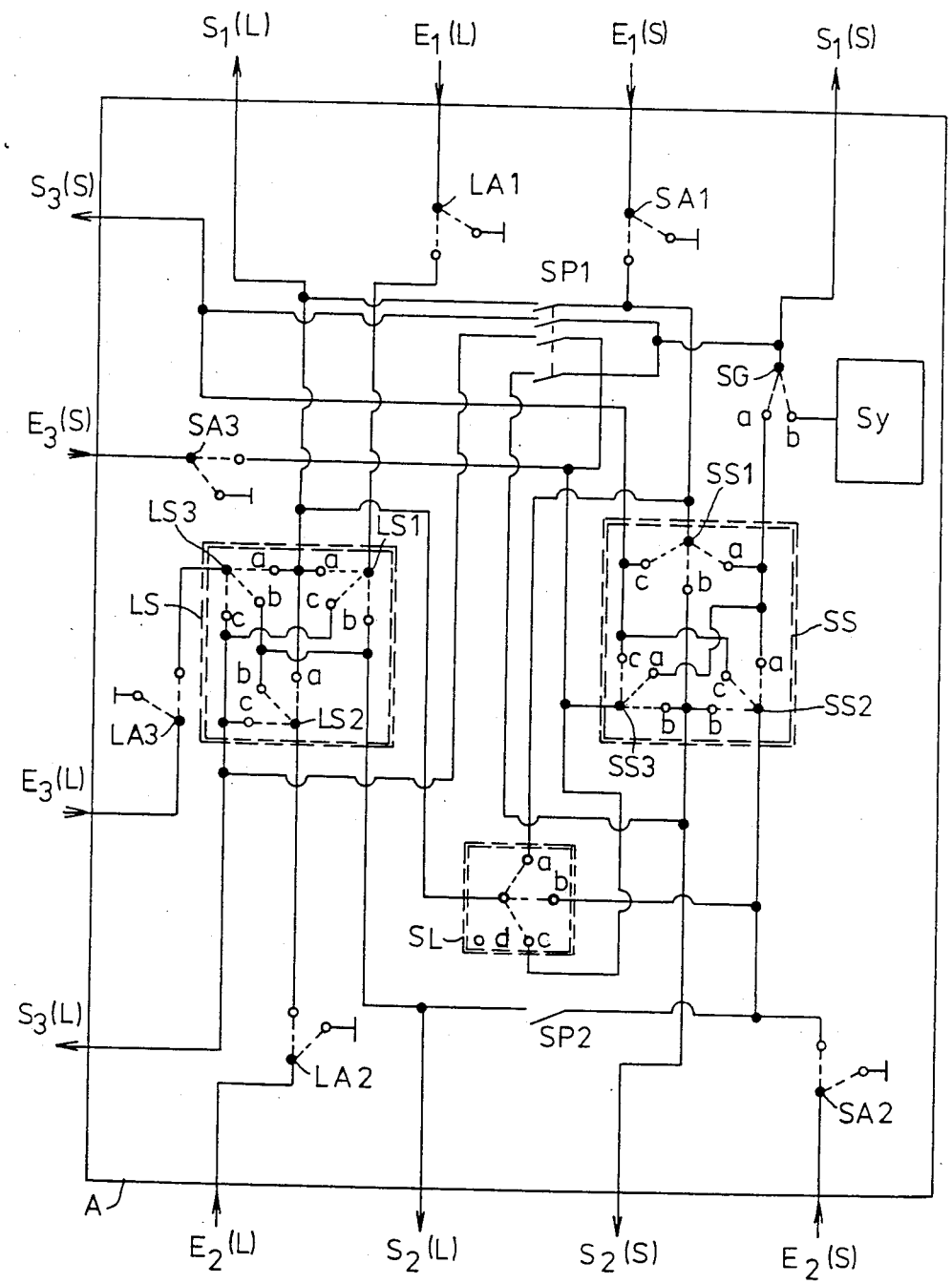
FIG. 8 shows the arrangement of switches for establishing connections with an interconnection unit in order to perform the reconfiguration, FIGS. to 9a to 9c show the various steps during the reconfiguration of an arrangement consisting of several interconnection units comprising three data connections each.

FIG. 8 shows an array of switches in an interconnection unit. The array of switches enables the described interconnection of the individual transmission paths to be simply realized. Therein, all elements which are not required for the following explanation have been omitted inside the interconnection unit A. For instance, in addition to the switches, only the synchronization device $S_y$ is shown.

Block SS contains the switches which establish the connections for the data paths of the write channel. Block LS contains the switches which establish the connections for the data paths of the read channel. The block SL contains the switch which can connect an incoming line of the write channel to the beginning of the read channel. The switches SP1 and SP2 serve for the interconnection of the test information. Furthermore, for each of the incoming lines $E_x(S)$ of all three incoming lines of the write channel there is provided a write channel termination switch SA1, SA2 and SA3. The write channel termination switch SA1, SA2, SA3 connects the relevant incoming line to a termination in order to prevent high-frequency interference from open lines. Similarly, for each incoming line $E_x(L)$ of the read channel, there is provided a read channel termination switch LA1, LA2 and LA3 which connects the relevant incoming line to a termination. These termination switches can be closed when, because of the relevant interconnection state of the other switches, no information enters via the relevant incoming line or when the information on the incoming line of the read channel is not be transmitted further. All switches are constructed as electronic switches.

The outgoing transmission line $S_1(S)$ is connected to the switch SG. The switch SG connects this line to the connections a of the switches SS1, SS2 and SS3 in its position a. In the position a, the switch SS1 connects the outgoing write line $S_1(S)$ to the incoming write line $E_1(S)$ of the same data connection. In the position a, the switch SS2 connects the outgoing line $S_1(S)$ of the write channel to the incoming line $E_2(S)$ of the write channel of the data connection 2. The switch SS3 similarly connects the outgoing line $S_1(S)$ of the write channel to the incoming line $E_3(S)$ of the write channel of the third data connection in its position a. Only one of the switches SS1 to SS3 can occupy the position a at a given instant. In the other positions, these switches SS1 to SS3 connect the outgoing lines of the write channel of the other two data connections to a respective incoming line of the write channel of one of the data connections. Similarly, in the position a, the switches $LS_1$ to $LS_3$ connect the outgoing line $S_1(L)$ of the read channel to an incoming line of the read channel of one of the data connections. It is again impossible for the three switches to occupy the same position simultaneously.

The switch SL connects the outgoing line $S_1(L)$ of the read channel of the first data connection to one of the incoming lines $E_x(S)$ of the write channel of one of the data connections or, in the position d, to none of the incoming lines of the write channel. In this case the outgoing line $S_1(L)$ of the read channel is connected, via the switches $LS_1$ to $LS_3$, to an incoming line of the read channel of one of the data connections. Connection of the outgoing line $S_1(L)$ to several sources is avoided. This is accomplished because in any of the positions a to c, of the switch SL, the input of the relevant switch LS1 to LS3 is separated from the corresponding incoming line of the read channel by the relevant switch LAx. The relevant switch $LS_1$ to $LS_3$ is then in position a.

In the position b of the switch SG, the synchronization device Sy is connected to the outgoing line $S_1(S)$ of the write channel of the first data connection. This is the normal position when the relevant interconnection unit A is to generate the synchronization information. This position b of the switch SG is also adjusted when test information is to be transmitted. Furthermore, the switches SP1 and SP2 are then closed, so that test information is also transmitted via the outgoing lines $S_1(S)$ and $S_3(S)$ of the write channels of the two other data connections. The incoming line $E_x(S)$ of the write channel of each data connection is connected to the outgoing line $S_x(L)$ of the read channel. The test configuration shown in FIG. 6 is thus obtained.

Th ⓡ connections of all necessary data paths can thus be established in a simple manner. The control of the individual switches is realized by a control system (not shown) which is preferably constructed as a microcomputer.

Figure 9A:
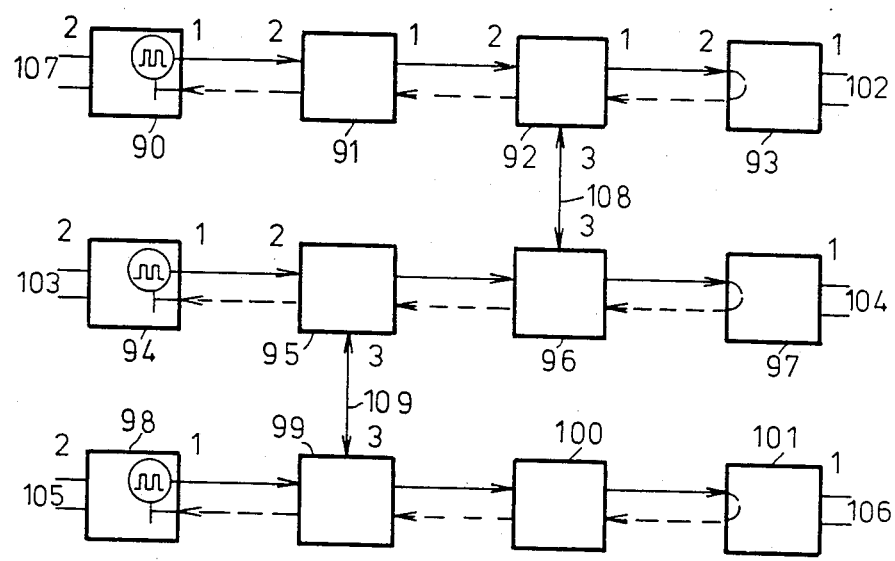
Figure 9B:
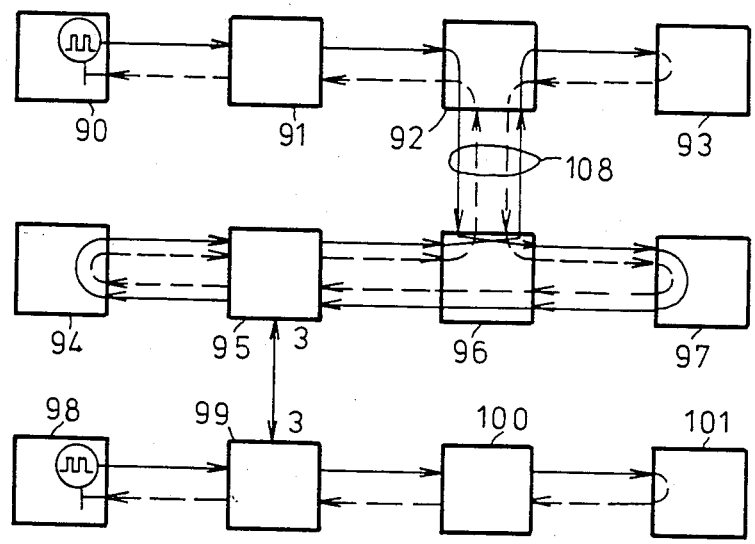
Figure 9C:
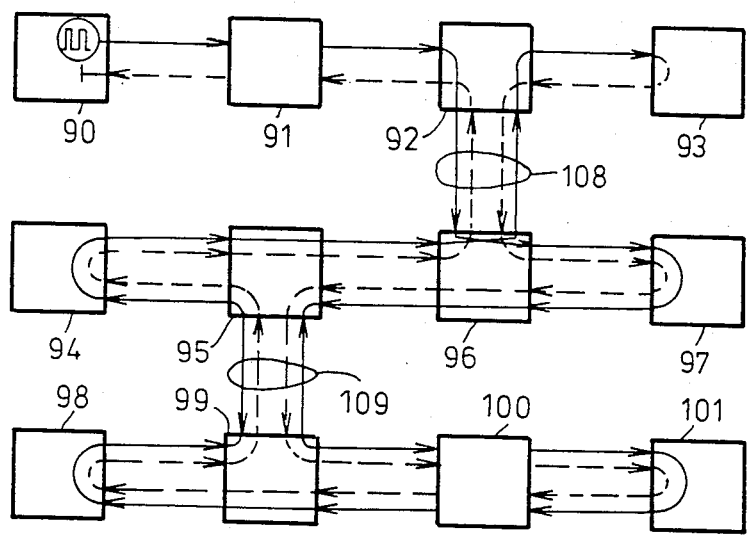

FIGS. 9a to 9c illustrate another possible reconfiguration of an arrangement of interconnection units in response to disturbances. The interconnection units have three data connections in the case of disturbances. This solution consists in the formation of a write and a read channel which include all interconnection units which are still connected. FIG. 9a shows twelve interconnection units 90 to 101. Initially, before the occurrence of a disturbance, all these units are interconnected via the connections between the data connections 1 and 2. Thus, a write channel (denoted by a solid line) is formed which covers all interconnection units 90 to 101. A corresponding read channel, denoted by a broken line, is also formed. To this end, the write channel and the read channel in the interconnection unit 93 were connected to the line 102 of the data connection 1 and the lines 103 of the interconnection unit 94. In the interconnection unit 94 the write line and the read line were also connected to the data connection 1. Similarly, in the interconnection unit 97, the lines 104 were connected at the data connection 1 to the lines 105 of the data connection 2 of the interconnection unit 98. Similarly, the lines 106 of the interconnection unit 101 were connected to the lines 107 of the interconnection unit 90. In an arbitrary interconnection unit the synchronization device was connected to the write line and the read line was connected to a termination. In this arbitrary interconnection unit or the preceding interconnection unit the connection between the write channel and the read channel was present. Overall an arrangement is assumed as shown in principle in FIG. 1. In FIG. 1 actually even more interconnection units can be present and follow, for example, the lines 102, 104 and 106, so that a correspondingly larger but otherwise simple loop is obtained for the write and the read channel.

In FIG. 9a it is assumed that the connections between the lines 102 and 103, 104 and 105 as well as between 106 and 107 are interrupted or disturbed so that no orderly data transmission can be performed thereon. Each interconnection unit detects these disturbances, as before, by interruption of the data stream on the write and the read channel. Each interconnection unit then transmits test information via at least the first and the second data connections. After transmission and evaluation of the test information, the interconnection units which are connected to another interconnection unit via the first and or the second data connection are connected pairwise. In this way they form their own sub-arrangement, in the manner described with reference to the FIGS. 2 to 4. Thus, in any interconnection unit in which the external connections are in order at the data connection 1 and in which the external connections are disturbed on its data connection 2, the write channel is connected to the synchronization device and the read channel is connected to a termination. This is shown for the interconnection units 90, 94 and 98. In the interconnection units in which the external connection is disturbed at the data connection 1 and the external connection is in order at the data connection 2, the write channel is connected to the read channel. Thus, the interconnection of the interconnection units as shown in FIG. 9a is obtained. No data are transmitted yet via the data connections 3. Thus, three sub-arrangements are obtained within which the interconnection units can exchange messages; however, they cannot exchange messages with interconnection units forming part of another sub-arrangement.

In order to enable the latter exchange, all interconnection units exchange test information via the connection of their data connections 3. Said information always contains the sequence number of the interconnection unit in the sub-arrangements in which the write channel is connected to the synchronization device. This happens because this sequence number has been transmitted to all interconnection units of each sub-arrangement during the reconfiguration of the write channel already performed. It is assumed that a non-disturbed connection 108 or 109 is detected between the interconnection units 92 to 96 as well as between 95 and 99, respectively. These non-disturbed connections are the third connections. The third connections of the other interconnection units, for example, are also liable to be disturbed or it may be that some units thereof are not connected in order to enhance the simplicity of the connections. This depends on the relevant application and the probability of occurrence of disturbances at given locations. The exchange of test information via the data connections 3 can take place without disturbing the data transmission on the write and read channels extending via the data connections 1 and 2.

During the evaluation of the test information it may occur, notably when a sub-arrangement includes a large part of the total number of interconnection units present, that the same sequence number is contained in the test information of individual interconnection units. This means that these interconnection units belong to the same sub-arrangement and are already interconnected via the data connections 1 and 2.

These interconnection units are not involved in the further reconfiguration of the overall arrangement. However, when an interconnection unit has received another sequence number in the test information received on the data connection 3 (like the interconnection units 92, 95, 96 and 99 in FIG. 9a), this sequence number is transmitted, via the already existing write and read channel to the interconnection unit in which the synchronization device is connected to the write channel. Thus, in each of the interconnection units 90, 94 and 98 it is known which sequence numbers are assigned to the neighbouring sub-arrangements.

When a sub-arrangement receives a sequence number having a higher priority, i.e. a sequence number which is lower than its own sequence number, this sub-arrangement transmits an acknowledgement to the sub-arrangement having the lowest sequence number. The acknowledgement is transmitted via the interconnection unit which is situated nearest to the beginning of the write channel. Thus, the fact is taken into account that a sub-arrangement can communicate with the same other sub-arrangement via several interconnection units. This is because an unambiguous location must be determined for the subsequent interconnection of the two sub-arrangements. The sub-arrangement having the lowest sequence number then returns an acknowledgement only to the sub-arrangement having the next-higher sequence number. This is because a plurality of sub-arrangements having different sequence numbers can directly communicate, independently from one another, with the sub-arrangement which has the highest sequence number. However, interconnection of that sub-arrangement has not yet taken place. Only the sub-arrangement receiving the acknowledgement enters a waiting state in which the beginning of the write channel in the interconnection unit is disconnected from the synchronization device and connected to the incoming line of the unused write channel. Similarly, the incoming line of the read channel, thus far connected to a termination, is connected to the outgoing line of the unused read channel. This is applicable to the data connection 1 of this interconnection unit, i.e. the interconnection unit 94. Similarly, the incoming and outgoing lines of the data connection 2 of the interconnection unit 97 at the other end of each sub-arrangement are interconnected.

At the end of a frame, the sub-arrangement having the lowest sequence number then separates the read channel and the write channel in the interconnection unit having received the lowest sequence number from the other sub-arrangement. This lowest sequence number from the other sub-arrangement is the next-higher sequence number in comparison with the sequence number of the relevant interconnection unit, i.e. the interconnection unit 92. The sub-arrangement connects the ends of the relevant interconnection unit to the corresponding line connections of the data connection. In this way the write channel and the read channel are connected, via the connection 108 and the data connection 3 of the interconnection unit 96, to the write channel and the read channel which are also separated therein. Thus from the above two sub-arrangements a new sub-arrangement is formed. The new sub-arrangement comprises the interconnection units 90 to 97. Said new sub-arrangement also comprises a write channel which extends from the interconnection unit 90 to the interconnection unit 93 and a read channel which returns therefrom to the interconnection unit 90. The first synchronization information which subsequently arrives via the newly formed write channel then interconnects two sub-arrangements into a new, larger sub-arrangement. This new larger sub-arrangement comprises a write channel and a read channel covering all interconnection units as shown in FIG. 9b. The new sub-arrangement has the sequence number of the interconnection unit 90. Special control information ensures that the information gap occurring during switching over is not interpreted as a disturbance initiating a reconfiguration.

The new sub-arrangement, consisting of the interconnection units 90 to 97, must now be connected to the original third sub-arrangement. The triangle third sub-arrangement comprises the interconnection units 98 to 101. The described procedure is therefore repeated between the two sub-arrangements now present. In other words, in the interconnection units 98 to 101 the line connections of the write channel and the read channel are connected as in the interconnection units 94 to 97. In addition, in the interconnection units 95 and 99, these channels are interrupted and interconnected via the connection 109 between the data connections 3. Ultimately, an arrangement is obtained as shown in FIG. 9c in which all interconnection units 90 to 101 are interconnected via a common write channel and read channel.

It will be apparent that such a reconfiguration can also be carried out for other disturbed locations or for other interconnections of interconnection units, via the data connections 3. For example, let us assume that a connection is present between the data connections 3 of the interconnection units 93 and 101 and that the lower sub-arrangement consisting of the interconnection units 98 to 101 has a lower sequence number than the central sub-arrangement. The central sub-arrangement consists of the interconnection units 94 to 97. The upper and the lower sub-arrangement would then first be interconnected in a similar manner, and subsequently the central sub-arrangement would be connected thereto. A write channel and a read channel covering all interconnection units would again be obtained, but with a slightly different route from that shown in FIG. 9c; however, data transmission would again be possible from any interconnection unit to any other interconnection unit.

What is claimed is:

1. An apparatus for transmitting data between a plurality of input and output devices comprising:
   (a) a plurality of interconnection units of substantially equivalent capability, each said interconnection unit being connecting to an input and/or output device;
   (b) at least two transmission paths, for data transmission in two respective opposite directions, said paths communicating, in a non-disturbed case, so that at least one path is formed which successively passes through all said interconnection units;
   (c) at least two physically separate data connections for each said interconnection unit, each said data connection including at least two connection lines, for coupling with and for forming said paths;
   (d) a plurality of detector means, one in each interconnection unit, each respective detector means for:
   (i) monitoring at least one data stream on said paths and detecting any disturbance therein;
   (ii) activating a respective synchronization means in the same interconnection unit as the respective detector means; and
   (iii) connecting respective ones of said data connections, for the same interconnection unit as the respective detector means, to: one another, data connections of neighboring interconnection units, and said synchronization means;
   (e) a plurality of said synchronization means, one in each interconnection unit, each respective synchronization means for:
   (i) generating synchronization information;
   (ii) generating test information, upon activation by the respective detector means in the same interconnection unit; and
   (iii) reading test information from neighboring interconnection units;
   (f) the above elements interacting so that:
   (i) in said non-disturbed case, one synchronization means generates synchronization information on said stream for all said interconnection units; and
   (ii) upon detection of aid disturbance in said stream:
      (A) said respective detector means activate their respective synchronization means and connect their respective data connections to generate test information to and read test information from at least one respective neighboring interconnection unit; and
      (B) said respective detector means subsequently couple their respective data connections with: one another; data connections of a neighboring interconnection unit; or their respective synchronization means, acfcording to whether and on which data connection test information was received, and according to what information was received, whereby said detector means thus interconnect said data connections outside a location of a disturbance to form a new transmission path which interconnects all of said interconnection units which are themselves functioning and which have at least one functioning data connection for coupling with and for forming said new path.

2. The apparatus of claim 1, wherein upon detection of said disturbance and after transmission of test information, said respective detector means initiate transmission of acknowledge information in response to correct receipt of test information and evaluate subsequent information at least on all data connections on which test information from a neighboring interconnection unit has appeared.

3. The apparatus of claim 1, wherein:
said respective detector means connect the lines of at least one of their respective data connections so that test information received from a neighboring interconnection unit is returned thereto.

4. The apparatus of claim 1, wherein:
(a) a first one of said paths serves as a write channel for processed data and;
(b) a second one of said paths serves as a read channel for data to be processed; the apparatus further comprising and further comprising:
(c) a plurality of means, one in each interconnection unit, for determining whether said write channel has passed through all said other interconnection devices; and (d) a plurality of means, one in each interconnection unit, for connecting said read channel to the end of said write channel in said non-disturbed cae, in any respective interconnection unit which determines that said write channel has passed through all said interconnection units.

5. The apparatus of claim 4, comprising:
(a) a plurality of termination elements, one in each interconnection device;
(b) a plurality of means, one in each interconnection unit, for connecting the write channel to the read channel if in the case of said disturbance the respective interconnection unit has not received correct test information via the write channel but has received correct test information via the read channel; and
(c) a plurality of means, one in each interconnection unit, for connecting the write channel to the respective synchronization means, and for connecting the write channel to said termination element if in the case of said disturbance the respective interconnection unit has not received any test information from any neighboring interconnection unit.

6. The apparatus of claim 4, comprising:
(a) at least four said lines in each said data connection, first and second said lines being incoming and outgoing, respectivley, for coupling with and forming said read channel, third and fourth said lines being incoming and outgoing lines, respectively, for coupling with and forming said write channel, so that said write channel and said read channel communicate with all interconnection units and extend separately in parallel;
(b) said respective detector means in case of said disturbance:
(i) transmitting test information on said respective fourth line of all said respective data connections;
(ii) evaluating test information arriving on said respective first and third lines of all said respective data connections; and
(iii) interconnecting each said respective data connections with said read and write channels only upon determining that all four said lines of the relevant respective data are functional.

7. The apparatus of claim 6 wherein:
(a) a distinct sequence number is assigned to each interconnection unit and also represents the components thereof;
(b) respective test information comprises the sequence number of the respective transmitting interconnection unit; and
(c) said respective detector means evaluate said sequence numbers contained in test information received from neighboring interconnection units.

8. The apparatus of claim 1 comprising:
(a) a plurality of groups of said interconnection units such that each said interconnection unit is part of one of said groups;
(b) at least three said data connections for each interconnection unit;
(c) said lines all being either incoming to or outgoing from their respective interconnection unit;
(d) a plurality of distinct sequence numbers, one assigned to each interconnection unit and also representing the components thereof;
(e) said paths being formed:
(i) within each group, using two of said three data connections from each interconnection unit of the group;
(ii) between said groups, using the third of said three data connections from at least one of said interconnection units from each said group, so that at least one said path communicates in a non-disturbed case with all said interconnection units;
(f) said respective detector means, upon detection of said disturbance of said stream:
(i) causing test information to be transmitted via all of said respective three data connections, said test information comprising the respective sequence numbers of the respective interconnection units;
(ii) connecting respective incoming and outgoing line connections depending on:
(A) whether and on what data connection test information has been received;
(B) content of test information; and
(C) a one of said respective data connection on which, after transmission of all test information, said stream appears from a particular synchronization means having a particular sequence number;
so that:
(D) at least one said new path is formed which extends via all said interconnection units which are functioning and which have at least one respective functioning data connection for coupling with and for forming said new path;
(E) in one of said interconnection units which:
(I) does not receive in any test information a sequence number which has a predetermined relationship with its own sequence number; and
(II) determines that its data connections are coupled with said new path and are functional;
the respective detector means connects the respective synchronization means to the outgoing line of a predetermined data connection.

9. The apparatus of claim 8 wherein said predetermined relationship is being of lower numerical value.

10. The apparatus of claim 8 comprising:
(a) a first one of said paths serving as a write channel for processed data;
(b) a second one of said paths serving as a read channel for data to be processed;
(c) at least four said lines being in each said data connection, first and second said lines being incoming and outgoing, respectively, for coupling with and for forming said read channel, third and fourth said lines being incoming and outgoing respectively for coupling with and for forming said write channel;
(d) a plurality of switches, one for each incoming line of each data connection in each interconnection unit, said switches being controlled by said respective detector means, said switches selectably coupling said lines so that:
(i) each incoming line is selectably coupled with at most one of said outgoing lines of at most one of said three respective data connections for the respective interconnection unit;
(ii) each outgoing line is selectably coupled with at most one of said incoming lines of at most one of said three respective data connections for the respective interconnection unit;
(iii) said fourth line of a predetermined one of said three respective data connections for each interconnection unit is selectably coupled to one of said incoming lines of the respective interconnection unit or to the respective synchronization means; and (iv) said second line of said predetermined one of said three respective data connections for each interconnection unit is selectably coupled to one of said third or one of said first lines of one of the three respective data connections.

11. The apparatus of claim 7 comprising:

(a) at least three said data connections for each interconnection unit;

(b) at least one remote interconnection unit, equivalent in capability to said interconnection units;

(c) said read and write channels being formed, in said non-disturbed case using two of said three respective data connection for respective interconnection units, the third respective data connection for at least one said interconnection unit being coupled to a corresponding third data connection for said at least one remote interconnection unit;

(d) a plurality of means, one in each interconnection unit, each for determining whether said respective sequence numbers have a predetermined relationship with the other sequence numbers;

(e) said new paths including a new read channel and a new write channel formed from said two respective data connections of at least two said interconnection units, said at least two units having determined that their respective sequence numbers have said predetermined relationship with the respective sequence numbers of the other interconnection units;

(f) a plurality of means, one in each interconnection unit, for iteratively testing and extending said new read channel and said new write channel, each including:

(i) means for coupling said respective synchronization means to said new write channel if the respective interconnection unit determines that its sequence number has said predetermined relationship with the sequence numbers of the other interconnection units, thereby forming a beginning of the new write channel;

(ii) means for coupling said new write channel to said new read channel it the respective interconnection unit determines that its sequence number has said predetermined relationship with the sequence numbers of the other interconnection units, thereby coupling a beginning of said read channel to an end of said new write channel;

(iii) means for reinitiating transmission and evaluation of test information so that at least one additional interconnection unit is identified for coupling with said new read and write channels, said additional interconnection unit having a sequence number such that in a group formed of: the interconnection units already coupled to said new read and write channels; and said additional interconnection unit, all the sequence numbers have said predetermined relationship with the interconnection units which are both not coupled to said new read and write channels and not the additional interconnection unit;

(iv) means, one in each interconnection unit, for coupling, if the respective interconnection unit is said additional interconnection unit, with the new read and write paths, using said respective data connections;

(v) means for repeating f)i)–f)v) until all interconnection units couplable to said new read and new write channels are so coupled.

12. An interconnection unit for transmitting data to and from input and output devices and to and from other equivalent interconnection units, comprising:

(a) at least two data connections, each including at least two connection lines, said lines being for coupling with and for forming at least two transmission paths through said unit, said paths being for data transmission in two respective opposite directions;

(b) means for monitoring data streams on said paths and for detecting a disturbance in said streams;

(c) means for generating test information;

(d) means for activating said means for generating test information upon detection of said disturbance by said means for monitoring;

(e) means for reading and evaluating test information received on said paths;

(f) means for determining which data connection said test information arrived;

(g) means for selectably connecting said lines:

(i) in a non-disturbed case, to couple with and to form said paths;

(ii) in the case of said disturbance, (A) to transmit and receive test informaton; and (B) after transmission of test information, to reform said paths according to whether and on which data connection test information was received, and according to what information was received so that new paths and extended transmission paths are formed which avoid a location of said disturbance.

13. The interconnection unit of claim 12, comprising:

(a) means for transmitting acknowledge information in response to receipt of correct test information; and (b) means for evaluating acknowledge information at least from any data connection on which test information from a neighboring interconnection unit has appeared.

14. The interconnection unit of claim 13, wherein said means for selectably connecting comprises means for connecting the lines of at least one data connection so that test information received from said neighboring interconnection unit is returned thereto.

15. The interconnection unit of claim 12 wherein:

(a) a first one of said paths serves as a write channel for processed data;

(b) a second one of said paths serves as a read channel for transmission of data to be processed;

(c) means for determining if said write channel is coupled with an extended write channel which has traversed all said other interconnection units; and (d) means for connecting an end of the extended write channel to a beginning of an extended read channel, coupled to said read channel, if said extended write channel has traversed all said other interconnection units.

16. The interconnection unit of claim 15, wherein said means for selectably connecting comprises:

(a) means for generating synchronizaiton information:

(b) a termination element;

(c) means for connecting said read channel and said write channel if in said disturbed case said interconnection unit has received test information via the write channel but not via the read channel; and (d) means for connecting said write channel: to said means for generating synchronization information, to said means for generating test information, and to said means for reading test information and for connecting said read channel to said termination element if upon detection of said disturbance said interconnection unit has not received test information from any neighboring interconnection unit.

17. The interconnection unit of claim 15, comprising:
(a) at least four said lines in each said data connection, first and second lines being incoming and outgoing, respectively, for coupling with and forming said read channel, third and fourth said lines being incoming and outgoing, respectively, for coupling with and forming said write channel, so that a data path to all said other interconnection units is formed in said non-disturbed case, in which said write channel and said read channel are physically separate and in parallel;
(b) means for determining in case of a disturbance whether said second line is functional; and
(c) said means for selectably connecting, in the case of said disturbance, connecting said lines:
 (i) to transmit test information via said fourth line of each said data connection;
 (ii) to receive test information transmitted both by the respective interconnection unit and by a neighboring interconnection unit via the third and first lines, respectively, of each said data connection, thereby allowing vertification that said first, second and fourth lines are functional; and
 (iii) to interconnect said lines of said data connections to couple with and form said read and write channels only upon a determination that all four said lines of the respective data connection are functional.

18. The interconnection unit of claim 17 wherein said means for determining whether said second line is functional comprises means for transmitting and evaluating acknowledge information.

19. The interconnection unit of claim 15 wherein:
(a) a sequence number is assigned to said interconnection unit which distinguishes it from said other interconnection units;
(b) said means for generating test information includes said sequence number in its test information;
(c) said means for reading such test information includes means for recognizing sequence numbers.

20. The interconnection unit of claim 19 comprising:
(a) means for determining whether said sequence number has a predetermined relationship with sequence numbers of said other interconnection units;
(b) means for generating synchronization information if said sequence number has said predetermined relationship.

21. The interconnection unit of claim 20 wherein said predetermined relationship is having a lower numerical value.

22. A method of locating and avoiding a disturbed portion of a data path, said path successively interconnecting a plurality of interconnection units, said path including two channels for data transmission in two respective opposite directions, each interconnection unit coupling an inpout and/or output device to said path, each interconnection unit having at least two physically separate data connections each data connection including at least two connection lines for coupling with and for forming said path, said method comprising:
(a) monitoring a data stream on said path by each interconnection unit simultaneously and in parallel;
(b) detecting a disturbance in said data stream by each interconnection unit in parallel said disturbance reaches the respective interconnection unit;
(c) interrupting said path by each interconnection unit upon detection of said disturbance;
(d) generating test information by each interconnection unit in parallel upon detection of said disturbance by the respective interconnection unit;
(e) transmitting said test information by each interconnection unit in parallel to at least one respective neighboring interconnection unit, of the respective interconnection unit, along said path;
(f) reading any said test information received along said path by each interconnection unit in parallel;
(g) first determining, by each interconnection unit, on which of its respective data connections any said test information was received and whether that test information a functioning neighboring interconnection unit;
(h) reconnecting said path by each interconnection unit coupling each of its respective data connections when test information was received on the respective data connection and that test information indicated that the relevant neighboring interconnection unit was functioning.

23. The method of claim 22 comprising:
(a) transmitting acknowledge information by each interconnection unit which has received test information indicating said functioning neighboring interconnection unit, said transmitting being from the data connection along which the relevant test information was received;
(b) evaluating acknowledge information by each interconnection unit at least from any data connection on which the relevant test information was received.

24. The method of claim 23 comprising:
connecting by each interconnecting unit of any data connection on which test information was received from a neighboring interconnection unit so that the relevant test information is returned to the relevant neighboring interconnection unit.

25. The method of claim 22 comprising:
(a) first sending processed data along a first one of said channels, thereby using aid first channel as a write channel;
(b) second sending data to be processed along the second of said channels thereby using said second channel as a read channel;
(c) second determining by each interconnection unit in parallel whether its respective write channel is coupled with an extended write channel which has traversed all said other interconnection units; and
(d) first connecting an end of the extended write channel to a beginning of an extended read channel coupled to the respective read channel in one interconnection unit if said one interconnection unit determines that said extended write channel has traversed all said other interconnection units.

26. The method of claim 25 comprising:
(a) second connecting said read channel to said write channel by any interconnection unit which in said disturbed case has received test information via its write channel but not via its read channel;
(b) third connecting, by any interconnection unit which has not received test information from any other interconnection unit, said write channel to: a means for generating synchronization information located in the interconnection unit, means for generating test information, and means for reading test information; and said read channel to a termination element located in the interconnection unit.

27. The method of claim 25 comprising:
(a) verifying whether four lines of each data connection in each interconnection unit are functional, first and second said lines being incoming and outgoing respectively for coupling with and forming said read channel, third and fourth said lines being incoming and outgoing respectively for coupling with and forming said write channel, so that said path in said non-disturbed case comprises said write channel and said read channel extending physically, separately and in parallel, said vertifying occurring in parallel in each interconnection unit for each data connection and including:
  (i) said transmitting of said test information being via said fourth lines;
  (ii) receiving test information, transmitted both by each respective interconnection unit and by a neighboring interconnection unit, via first and third lines respectively;
  (iii) returning test information received from a neighboring interconnection unit to that neighboring interconnection unit via said second line of the data connection on which test information was received from the neighboring interconnection unit;
  (iv) transmitting acknowledge information via said fourth lines, acknowledging receipt of each interconnection unit's own test information from the relevant data connection;
  (v) evaluating acknowledge information received from neighboring interconnection units via said third lines of the relevant data connections, thereby verifying the functionality of the second lines of the revelant data connections;
(b) said reconnecting step including reconnecting said four lines of each data connection to couple with and form said read and write channels upon verifying that all four lines of the data connection are functional.

28. The method of claim 25 wherein:
(a) said generating said step includes generating said test information to include a unique sequence number which identifies each interconnection unit; and
(b) said first determining step includes recognizing said sequence numbers.

29. The method of claim 28 comprising:
(a) third determining by each interconnection unit whether its sequence number has a predetermined relationship with the sequence numbers of all said other interconnection units which are connected to the relevant interconnection unit via a chain of functioning data connections;
(b) second generating synchronization information by an interconnection unit which determines that is sequence number has said predetermined relationship.

30. The method of claim 29 comprising:
(a) forming groups of aid interconnection units such that each said interconnection unit is part of one of said groups, said groups being formed using two out of three data connections in each interconnection unit of the groups;
(b) connecting said groups to one another using a third data connection of at least one interconnection unit in each group to form intergroup connections.

31. The method of claim 30 wherein said reconnecting step comprises:
iteratively testing and extending said new read channel and said new write channel, starting with an interconnection unit having said predetermined relationship with all the other interconnection units and proceeding one-by-one to all the other interconnection units, in an order determined by said predetermined relationship.

* * * * *